April 25, 1950  P. W. KRIDLER  2,505,051
FISH LURE
Filed May 19, 1944
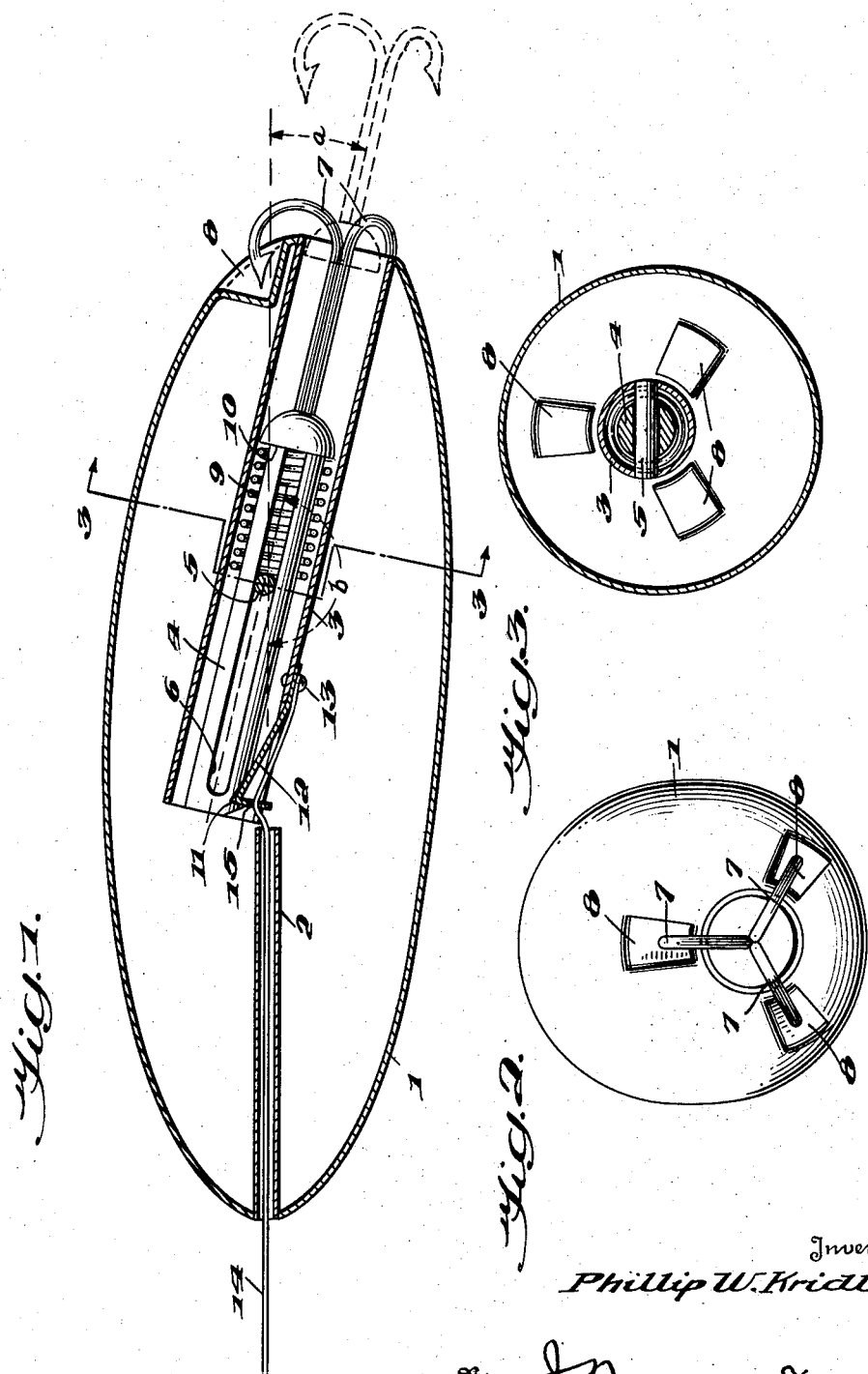
Inventor
Phillip W. Kridler,
By J. Windsor Davis
Attorney Patented Apr. 25, 1950

2,505,051

UNITED STATES PATENT OFFICE 2,505,051

FISH LURE

Philip W. Kridler, Detroit, Mich.

Application May 19, 1944, Serial No. 536,317

6 Claims. (Cl. 43—35)

This invention relates to fish lures of the general type in which fish hooks are retractable into the lure body and which are extensible under spring action in response to a tug on the line by the fisherman.

An object of this invention is to provide a lure which will have an inherent wobbling movement when pulled through the water in order, more adeptly, to attract fish.

Another object is to provide a lure having extensible and retractable fish hooks, the hooks being extensible rearwardly of the lure body. Thus when a fish overtakes the lure from the rear after being attracted by the wobbling movement of the body, the hooks will be directed into its mouth.

A further object is to provide an improved trigger device comprising a trigger through which the lure leader directly extends without kinking or undue bending and which can be tripped by a tug on the leader. The trigger device is simple of design, economical to manufacture and reliable in action when made of properly chosen materials.

Other objects and advantages will become hereinafter more full apparent as reference is had to the accompanying drawings in which my invention is ilustrated and in which Figure 1 is a longitudinal diametric section through my improved lure, Figure 2 is an elevation taken directly from the rear of Figure 1, and Figure 3 is a transverse section taken along the line 3—3 of Figure 1.

More particularly 1 indicates the main body of the lure which is generally of oval shape in longitudinal cross section. A small tube 2 is integrally secured within the tube to the front end or nose thereof. This tube extends lengthwise with respect to and is approximately co-axial with the long axis of the fore part of the body 1.

A second tube 3 is integrally secured within the body 1 near the rear or tail end thereof. A plunger 4 is slidable or traversable in this tube 3 to the extent permitted by a pin 5 which is fixed in the tube 3 and which extends through a slot 6 in the plunger. To the outer end of the plunger 4 a gang of three fish hooks 7 is secured, the outer end of which projects outwardly of the tube 3 and body 1 at all times. When the plunger 4 is in retracted position, as illustrated, the ends of the hooks are received in protective recesses 8. When the plunger is in extended position the hooks extend substantially outwardly of the body 1, their entire shanks and at least a substantial portion of the hook ends then being below the axis of the tube 2. The extended position of the hooks and hook shanks is indicated in dotted lines in Figure 1.

The plunger 4 is urged outwardly or in hook extending position by a spring 9 which is concentric with the plunger. This spring seats at one end on the pin 5 and on a shoulder 10 on the plunger 4 at its other end.

The plunger is notched at 11 near its inner end to receive a trigger 12 which is made of spring stock and achored at 13 to the tube 3. A leader 14 is also anchored to the tube 3 at some convenient point 13'. The leader passes outwardly of the body 1 by way of the tube 2 and between its point of anchorage 13 and the tube 2 it is threaded through an opening 15 in the trigger 12.

It will be noted that the tubes 2 and 3 are not co-axial but angularly disposed in such manner that their axes intersect rearwardly of the transverse center line of the body 1 forming an acute angle "a" and an obtuse angle "b". This causes the body 1 to wobble during its flight through water thus attracting fish. Due to this angle the leader 14 is bent between the tubes 2 and 3 as it passes through the opening 15 so that a pull or tug on the leader 14 forces the trigger 12 out of the notch 11 thus permitting the spring 9 to project the plunger 4 with its hooks 7 to extended position. A push on the hooks 7 will return the plunger to cocked position.

Various modifications may be made without departing from the spirit of my invention and I desire to be extended protection within the scope of the appended claims.

What I claim is:

1. A fish lure comprising a main body of generally oval shape having a leader extending thereinto substantially along the longest axis thereof, at least one fish hook being extensible from and retractable substantially into said body, spring pressed plunger means to which said hook is secured located within said body and movable to and from extended and retracted position at an obtuse-acute angle with respect to the axis of the major portion of said leader when taut, said leader being secured to the interior of said body, and a latch device for retaining said plunger in retracted spring compressing position comprising a trigger operatively connected to said leader and operative in response to a sudden tug on said leader to release said plunger.

2. A fish lure comprising a lure body of generally oval shape having a first tube integrally secured therein toward the front end thereof and adapted to receive a leader, a second tube integrally secured within said body at the rear end thereof, and a spring pressed plunger having fish hooks secured thereto traversable in said second tube thereby extending and retracting said hooks with respect to said body, said first and second tubes being angularly disposed with respect to each other, and the axes of said tubes intersecting at a point rearwardly of the midsection of said body.

3. A fish lure comprising a lure body of generally oval shape having a first tube integrally secured therein toward the front end thereof and extending lengthwise of said body, a leader extending freely through said tube, a second tube fixedly secured within said body at the rear end thereof having a spring pressed plunger traversable longitudinally thereof, said second tube and said plunger being angularly disposed with respect to said first tube, said plunger having a plurality of fish hooks secured to one end thereof and traversable therewith to retracted and extended positions with respect to said body, and a trigger device for retaining said plunger in retracted position against the pressure of said spring, said leader being operatively connected to said trigger device for the release thereof whereby said hooks are projected outwardly of said body in a direction angularly of the long axis thereof.

4. A fish lure comprising a lure body of generally oval shape having a leader extending freely through the front end thereof, a spring pressed plunger traversable within the rear half of said body and having at least one fish hook secured to the outer end thereof, said plunger having a notch near the inner end thereof, and a spring trigger supported by said body engageable with said notch to restrain said plunger in retracted position, said leader being operatively connected to said trigger at an angle such that a tug on said leader disengages said trigger from said notch of the plunger.

5. A fish lure comprising a main body of generally oval shape, a leader extending freely through an opening in the front end of and substantially axially of said body, a tube secured within said body near the rear end thereof, a spring pressed plunger traversable in said tube and having at least one fish hook secured to the outer end thereof, said tube and said plunger being disposed at an angle to said leader, said plunger being notched near the inner end thereof, and a trigger of spring stock anchored at one end to said tube and having its other end engaging the notch in said plunger, said leader being attached to said tube at the point of attachment of said trigger and extending through an opening in the outer end of said trigger, and said leader being bent in passage through said opening whereby a pull exerted on said leader forces said trigger out of engagement with said notch thus causing ejection of said fish hook.

6. A fish lure comprising a lure body of generally oval shape having a first tube integrally secured therein toward the front end thereof and extending lengthwise of said body, a leader extending freely through said tube, a second tube fixedly secured within said body at the rear end thereof having a spring pressed plunger traversable longitudinally thereof, said second tube and said plunger being angularly disposed with respect to said first tube, said plunger having a plurality of fish hooks secured to one end thereof and traversable therewith to retracted and extended positions with respect to said body, said plunger being notched near its inner end, and a trigger composed of spring stock anchored to said second tube at one end and engaging said notch to retain said plunger in retracted position, said leader being threaded through a hole in the outer end of said trigger and also anchored to said second tube, and said leader being bent out of the line of said first tube in passing through said trigger hole whereby a pull exerted on said leader forces said trigger out of engagement with said notch.

PHILIP W. KRIDLER.

REFERENCES CITED

The following references are of record in the file of this patent:

UNITED STATES PATENTS

| Number | Name | Date |
| --- | --- | --- |
| 1,009,538 | Lowe | Nov. 21, 1911 |
| 1,021,699 | Norlund | Mar. 26, 1912 |
| 1,318,073 | Gottschalk | Oct. 7, 1917 |
| 1,345,173 | Hadler | June 29, 1920 |
| 1,466,616 | Fenner | Aug. 28, 1923 |
| 1,479,652 | Cranstone | Jan. 1, 1924 |
| 1,869,111 | McLaughlin | July 26, 1932 |
| 2,009,298 | Nelson et al. | July 23, 1935 |